Patented Nov. 27, 1951

2,576,139

UNITED STATES PATENT OFFICE 2,576,139

GLYCOL BIS-CHLOROSULFINATES

Alphonse Pechukas, Akron, Ohio, assignor to Pittsburgh Plate Glass Company, Allegheny County, Pa., a corporation of Pennsylvania No Drawing. Application December 20, 1947, Serial No. 793,043

10 Claims. (Cl. 260—456)

This invention relates to a novel class of esters and to a method of producing these materials. In accordance with the present invention, novel esters which are bis-halosulfinates of certain glycols, especially polyglycols, have been prepared. These compounds are halosulfinates of those glycols which have a chain at least three atoms in length between a pair of alcoholic hydroxyl groups. The novel esters are prepared by reacting a thionyl halide such as thionyl chloride, with the glycol or polyglycol. The reaction appears to proceed in substantial accordance with the following equation:

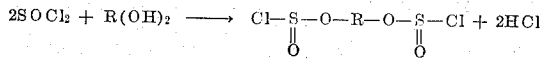

where R(OH)$_2$ is the glycol or polyglycol and R is an aliphatic group.

From the above equation it is apparent that the reaction proceeds in the proportion of 2 mols of thionyl chloride (or equivalent thionyl halide) per mol of glycol or polyglycol. However, the reaction normally is conducted in the presence of a rather substantial excess of thionyl chloride. As a general rule, an amount of thionyl chloride which is at least 25% and frequently as much as 100% in excess of the theoretically required amount is used.

In accordance with my invention, thionyl chloride is dissolved in a solvent having a relatively low boiling point, such as methylene chloride, and then heated under a reflux condenser. During reflux, a glycol such as diethylene glycol, may be added either alone or as a methylene chloride solution or similar solution. The amount of glycol used is limited so that thionyl chloride remains in substantial excess, for example 25 to 50% or more over that theoretically required to form the bis-halosulfinate. This step normally results in the production of some quantity of polymeric polyhydric alcohol-polybasic acid type of condensation product containing some quantity of the bis-halosulfinate. This condensation product may be reacted with thionyl chloride in not less than the stoichiometric amount required to produce bis-halosulfinate chloride by mixing the reactants and allowing them to stand for a considerable period of time, for example, one or two days. The bis-chlorosulfinate thus produced may be purified by distillation.

Other solvents for the thionyl chloride and the alcohol may be used. Typical solvents are methyl bromide, chloroform, carbon tetrachloride, trichloroethylene, ethylene fluoride, ethylene chloride, ethyl bromide, dichlorodifluoromethane and other hydrocarbon halides as well as toluene, xylene and other solvents which boil below about 50° C. or which will distill in vacuo below about 50° C. These materials are essentially non-solvents for HCl or HBr, considering the solubility of these acids below about 1 gm. per liter under standard conditions of temperature and pressure.

The compounds may also be prepared by mixing the reactants together without the addition of a low boiling point solvent. In carrying out this method, the temperature of the reaction mixture is usually maintained at a point below room temperature by means of cold water or by the use of refrigerants where even lower temperatures are desired. I have found that most satisfactory results were obtained by cooling the reaction vessel containing the thionyl halide to minus 10° C. at the outset and controlling the addition rate of the glycol so that the temperature of the reaction did not exceed minus 5° C. However, the desired reaction will occur at temperatures below 10° to 15° C. but the lower temperature ranges are preferred.

After the mixing of the reactants has been completed, the product is allowed to stand for an hour or more before permitting the temperature to rise above the maximum prevailing at the end of the mixing operation. When the reaction has been completed, excess thionyl chloride is distilled off by heating the mixture at a subatmospheric pressure, generally in the range of 2 to 5 millimeters of mercury to a temperature just short of that at which substantial decomposition tends to occur. In general, this heating in vacuo is conducted at temperatures below about 30 to 40° C. because of the tendency of the novel chlorosulfinates to decompose excessively at higher temperatures.

Chlorosulfinic esters of various glycols may be prepared. The invention is particularly concerned with the production of the bis-chlorosulfinates of polyglycols of the lower glycols which glycols contain 2 to 4 carbon atoms. Of especial interest in this respect are the polyglycols which contain 2 to 6 glycol units such as diethylene glycol, triethylene glycol, tetraethylene glycol, pentaethylene glycol, hexaethylene glycol, dipropylene glycol, tripropylene glycol, or dibutylene glycol, however, bis-chlorosulfinates of the higher polyglycols particularly polyethylene or polypropylene glycols which contain 7 to 17 glycol units such as nonaethylene glycol etc., may be prepared. Moreover, monoglycols may be reacted with thionyl chloride or similar thionyl halide to form bis-chlorosulfinates. Thus the invention may be applied to the production of chlorosulfinates of dihydroxy aliphatic hydrocarbons, preferably those containing up to 6 carbon atoms, and their halogen, nitrogen and alkoxy substitutes. Accordingly, the bis-chlorosulfinates of glycols such as trimethylene glycol, tetramethylene glycol, 1,4 butene diol, hexamethylene glycol, 3 methyl-1,3-butane diol, etc. may be prepared. Similarly, chlorosulfinic esters of the halogen or similar substituted products including 2 chloro-1,3-propane diol, beta glycerol monooleate, beta glycerol monoethyl ether, beta glycerol monobutyl ether or similar lower alkoxy substituted glycol wherein the alkoxy group contains up to 4 to 6 carbon atoms or the corresponding nitrates or bromides may be treated to form chlorosulfinates as herein contemplated. Furthermore, the chlorosulfinate of thio diglycol may be prepared in the same manner except that some quantity of mustard gas tends to be formed as a by-product and therefore considerable care must be exercised in the production of such a compound.

The esters herein contemplated particularly the esters of the lower liquid alkylene glycols containing 3 to 6 carbon atoms and the lower liquid polyglycols of glycols containing 2 to 4 carbon atoms which polyglycols contain up to about 6 glycol units, normally are mobile liquids ranging in color from light amber to brown. Not infrequently, these esters show a marked tendency to decompose upon standing at room temperature. They are readily decomposed by heating to temperatures above room temperature. This tendency toward decomposition may be minimized to a very substantial degree by storing the bis-chlorosulfinates herein contemplated at temperatures below about 10 to 15° C.

These chlorosulfinic esters may be used for various purposes. They are highly reactive and therefore may be used as intermediates. For example, they may be reacted with monohydric alcohol such as ethyl alcohol, normal propyl alcohol or normal butyl alcohol to form the corresponding glycol bis (alkyl sulfinates). These esters may also be reacted with higher hydroxy compounds such as hydrated cellulose, polyvinyl alcohol, etc. to form sulfur-containing derivatives thereof. These novel esters also may be used as solvents because of their tendency to dissolve a wide variety of compounds. Use of these compounds as insecticides, or in the production of sulfite or sulfur containing compounds which may be used as insecticides or wetting agents also is contemplated.

The invention may be illustrated by the following examples:

*Example I*

A one liter flask containing 952 grams of thionyl chloride was fitted with a Dry Ice condenser, thermometer, glass stirrer and dropping funnel. The flask and contents were cooled to minus 10° C. and 152 grams of trimethylene glycol was added dropwise, the rate of addition of the glycol being such that the reaction temperature was maintained at about minus 5° C. After the addition of the glycol the reaction was allowed to stand with stirring for two hours while maintaining the temperature at approximately minus 5° C. Thereafter, the excess thionyl chloride was distilled out of the mixture by allowing the temperature of the mixture to rise to 30° C. at a pressure of 2 mm. of mercury. Trimethylene glycol bis-chlorosulfinate was obtained as a clear brown liquid in approximately 94% yield. This compound has the following probable structure

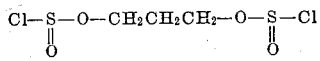

The product has an index of refraction $N_D^{20°\,C.}$ of 1.5210 and a density at 20° C. of 1.536 and a surface tension at 20° C. of 43 dynes per centimeter.

This ester tends to decompose slowly at room temperature but may be stored for a substantial period of time at 10° C. without appreciable decomposition. When monoethylene glycol is used in lieu of trimethylene glycol no bis-chlorosulfinate appears to be prepared.

*Example II*

A five liter flask containing 2856 grams of thionyl chloride was fitted with a thermometer, glass stirrer, Dry Ice condenser and dropping funnel. The flask and contents were chilled to minus 10° C. and 636 grams of diethylene glycol was slowly added while maintaining the temperature of the reaction mixture below minus 5° C. After the addition of the glycol the reaction was allowed to stand at approximately 0° C. for 1½ hours. Thereafter, the excess thionyl chloride was distilled out and the product purified by warming up to 30° C. under a pressure of 2 mm. of mercury. Diethylene glycol bis-chlorosulfinate was obtained in approximately 99% yield. This product is a clear light yellow liquid having an index of refraction $N_D^{20°\,C.}$ of 1.5200, a density of 1.521 and a surface tension at 20° C. of 45.7 dynes per centimeter. This product appears to be stable at room temperature. However, long storage tends to increase coloration and to turn the compound slightly turbid. The compound has the probable structure

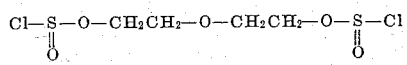

*Example III*

A one liter flask containing 714 grams of thionyl chloride was fitted with a Dry Ice condenser, thermometer, glass stirrer and dropping funnel. The flask and contents were cooled to minus 10° C. and 225 grams of triethylene glycol was added dropwise at a rate such that the reaction was maintained below minus 5° C. After the addition of the glycol, the reaction was allowed to stand with stirring at about 0° C. for about 2 hours. Thereafter, excess thionyl chloride was distilled out and the product was purified by warming to a temperature of 30° C. at a pressure of 3 to 4 mm. of mercury.

The ester thus obtained in approximately 100% yield was a clear amber liquid which had an index of refraction $N_D^{20°\,C.}$ of 1.5120, a density 4/20° C. of 1.453 and a surface tension at 20° of 34.2 dynes per centimeter. This product tends to decompose at room temperature. However, storage for approximately 30 days at 10° C. resulted in no appreciable decomposition. The compound has the probable structure

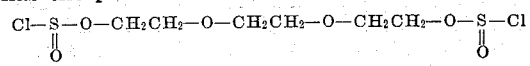

A similar ester may be prepared using tetraethylene glycol in lieu of triethylene glycol.

*Example IV*

119 grams of thionyl chloride was mixed with 100 ml. of methylene chloride and the resulting solution was heated at reflux temperature under a reflux condenser on a steam bath having a temperature of 70–75° C. During reflux, 26.5 gm. of diethylene glycol, dissolved in 100 ml. of methylene chloride was added to the refluxing mixture and the mixture was stirred for 10 minutes. Thereupon the reaction mixture was heated at 30° C. and 3 mm. pressure to distill off thionyl chloride and solvent. The remaining product was mixed with 30 gm. of thionyl chloride and the mixture was allowed to stand at room temperature for 43 hours. The product thus obtained was filtered and heated at 30° C. and a pressure of 3 mm. to drive off the thionyl chloride and any other remaining volatile materials.

The composition remaining is diethylene glycol bis-chlorosulfinate having the probable structure

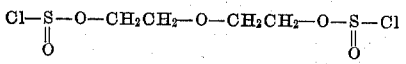

This product is a clear light yellow liquid having an index of refraction $N_D^{20°\,C.}$ of 1.5200, a density of 1.521 and a surface tension at 20° C. of 45.7 dynes per centimeter.

Although the present invention has been described with particular reference to the chlorosulfinates it is not limited thereto since the corresponding bromosulfinates may be prepared using thionyl bromide in lieu of thionyl chloride.

While the present invention has been described with reference to specific details of certain embodiments thereof it is not intended that such details shall be regarded as limitations upon the scope of the invention except insofar as included in the accompanying claims.

What is claimed:

1. A bis-chlorosulfinate of a glycol consisting of carbon, hydrogen and oxygen and having its two hydroxyl groups separated by at least three atoms.
2. A bis-chlorosulfinate of a polyalkylene glycol having at least one ether group between the hydroxyl groups of the glycol.
3. A bis-chlorosulfinate of a polyethylene glycol having at least one ether group between the hydroxyl groups of the glycol.
4. Diethylene glycol bis-chlorosulfinate.
5. Triethylene glycol bis-chlorosulfinate.
6. Trimethylene glycol bis-chlorosulfinate.
7. A bis-halosulfinate of a glycol consisting of carbon, hydrogen and oxygen having a pair of alcoholic hydroxyl groups which are separated by at least 3 atoms.
8. A method of producing a bis-chlorosulfinate which comprises adding a glycol having a pair of hydroxy groups which are separated by at least 3 atoms, to thionyl chloride while maintaining the concentration of thionyl chloride not less than two moles per mole of glycol.
9. A method of producing a bis-chlorosulfinate which comprises adding a glycol having a pair of hydroxy groups which are separated by at least 3 atoms, to thionyl halide while maintaining the concentration of thionyl halide not less than two moles per mole of glycol.
10. A bis-chlorosulfinate of a glycol having the formula HO—R—OH wherein R is a saturated divalent acyclic radical having at least three carbon atoms between its two free valences and selected from the group consisting of —(CH$_2$)$_n$—, and [CH$_2$—CHO]$_n$—CH$_2$—CH$_2$— wherein $n$ is a small integer.

ALPHONSE PECHUKAS.

REFERENCES CITED

The following references are of record in the file of this patent:

UNITED STATES PATENTS

| Number | Name | Date |
| --- | --- | --- |
| 2,465,915 | Myles et al. | Mar. 29, 1949 |
| 2,471,274 | Lingo | May 24, 1949 |

FOREIGN PATENTS

| Number | Country | Date |
| --- | --- | --- |
| 710,350 | Germany | Sept. 11, 1941 |

OTHER REFERENCES

Majima et al., "Centralblatt," 1927, part I, page 2415.

Kitasato et al., "Ber. Deut. Chem. Ges.," vol. 64 (1931), pages 1142–1145.

Denivelle, "Comptes Rendus," vol. 208 (1939), pages 1024–5.

Rovira et al, "Comptes Rendus," vol. 212 (1941), page 644.